(12) United States Patent
Robadey

(10) Patent No.: US 10,810,478 B2
(45) Date of Patent: Oct. 20, 2020

(54) TUBULAR SHAPED TAG STRUCTURE

(71) Applicant: ASSA ABLOY AB, Stockholm (SE)

(72) Inventor: Jean-Miguel Robadey, Bossonnens (CH)

(73) Assignee: ASSA ABLOY AB, Stockholm (SE)

( * ) Notice: Subject to any disclaimer, the term of this patent is extended or adjusted under 35 U.S.C. 154(b) by 14 days.

(21) Appl. No.: 16/318,292

(22) PCT Filed: Jul. 18, 2016

(86) PCT No.: PCT/IB2016/054264
§ 371 (c)(1),
(2) Date: Jan. 16, 2019

(87) PCT Pub. No.: WO2018/015783
PCT Pub. Date: Jan. 25, 2018

(65) Prior Publication Data
US 2019/0236428 A1 Aug. 1, 2019

(51) Int. Cl.
*G06K 19/077* (2006.01)
*G06K 19/07* (2006.01)

(52) U.S. Cl.
CPC ... *G06K 19/07749* (2013.01); *G06K 19/0719* (2013.01); *G06K 19/07718* (2013.01)

(58) Field of Classification Search
CPC ............ G06K 19/0719; G06K 19/07749
USPC ......................................... 235/492
See application file for complete search history.

(56) References Cited

U.S. PATENT DOCUMENTS

| 2006/0267572 | A1* | 11/2006 | Sellars | G06K 19/07745 324/90 |
| 2007/0103315 | A1 | 5/2007 | Geissler | |
| 2007/0182559 | A1 | 8/2007 | Lawrence et al. | |
| 2010/0066538 | A1* | 3/2010 | Ogata | G06K 19/07718 340/572.7 |

FOREIGN PATENT DOCUMENTS

| EP | 2605189 A3 | 10/2016 |
| WO | WO-2010018546 A1 | 2/2010 |
| WO | WO-2018015783 A1 | 1/2018 |

OTHER PUBLICATIONS

"International Application Serial No. PCT/IB2016/054264, International Search Report dated Apr. 12, 2017", 4 pgs.
"International Application Serial No. PCT/IB2016/054264, Written Opinion dated Apr. 12, 2017", 5 pgs.

* cited by examiner

*Primary Examiner* — Toan C Ly
(74) *Attorney, Agent, or Firm* — Schwegman Lundberg & Woessner, P.A.

(57) ABSTRACT

A self-sustainable substantially tubular shaped tag structure, comprises a flexible and substantially flat inlay comprising a substrate and at least an antenna; a wall of the tubular shaped tag structure constituted directly and solely by the inlay that is formed into the shape of the wall, thereby excluding any other material to carry the inlay and realize the wall; and a seam configured to close the tubular shaped tag structure and involving borders of the inlay.

18 Claims, 2 Drawing Sheets

(STATE OF THE ART)

(STATE OF THE ART)

TUBULAR SHAPED TAG STRUCTURE

CROSS-REFERENCE TO RELATED APPLICATIONS

The present application is a national stage entry of International PCT Appl. No. PCT/IB2016/054264, titled "A Tubular Shaped Tag Structure," filed Jul. 18, 2016, which is hereby incorporated by reference herein in its entirety.

TECHNICAL FIELD

The invention relates to contactless tags, and more specifically tags having a tubular shaped structure such that they can operate in three dimensions.

BACKGROUND

Tags—or smart tags, contactless tags—technology allows for a comparatively secure form of identification, which does not require any physical contact and is not dependent on line-of-sight for identifications.

Tags may for example be implemented by means of RFID technology, which involves RFID tags, and adapted transmitter- and reader-devices to communicate with the RFID tags.

RIFD tags typically comprise an integrated circuit for storing and processing information, modulating and demodulating a radio frequency (RF) signal, and an antenna for receiving and transmitting a RF signal.

An RFID tag typically comprises a substrate on which there is the integrated circuit and the antenna, whereby the antenna may be made in form of an antenna pattern. The substrate can be rigid or flexible, in particular a flexible plastic material or paper material.

The antenna pattern is typically formed of a metal wire pattern that is printed—or otherwise transferred—on the substrate. The antenna pattern may further be covered by a protective layer, for example a layer of transparent plastic.

The RFID antenna of the RFID tag absorbs, couples with, and/or reflects radio frequency signals from the transmitter (that incidentally may be included in the reader device) and provides a signal and power to the attached integrated circuit of the RFID tag.

In the RFID tag, the integrated circuit receives the received RF signals from the antenna and modulates the back-scattered signal so as to send information stored on the integrated circuit back to the reader.

The antenna pattern needs to be efficient to absorb incident electromagnetic radiation from the reader and to back-scatter electromagnetic radiation back to the reader. Furthermore, the connection between the antenna pattern and the integrated circuit needs to be efficient to supply sufficient energy to the integrated circuit.

The radiation, or gain pattern, of the antenna impacts the performance of the antenna. RFID tags with two-dimensional antennae may be applied inside a package or product, applied underneath a self-adhesive label containing graphics, and/or located on top of the package or product. These RFID tags may for example be applied to a single surface of a multi-surface package. Because of the two-dimensional structure, the antenna structure is inherently limited in the directionality of the radiation pattern. Expressed differently, the two-dimensional antenna structure suffers the disadvantage of having a void in one dimension. As a result, the antenna device is sensitive to the orientation with the reader antenna—i.e., the antenna from the reader device.

In other words, the orientation of the two-dimensional antenna is limited to the position of the package in relation to the reader antenna. In addition to orientation sensitivity, when using a package, materials within the package, such as metals and/or liquids, may further interfere with the operation of the antenna.

The broad concept of three dimensional tag shaped antennas is already well described in prior art, more particularly the advantages of using three-dimensional structures as compared to two-dimensional structures. For example, US publication US20070182559 explains that in contrast to a two-dimensional antenna, a three-dimensional antenna is operable to more effectively communicate with a three-dimensional electromagnetic field. A three-dimensional antenna may result in substantial improvements to orientation sensitivity, environmental robustness, and potential antenna design innovation. Furthermore, three-dimensional antennae may be able to cover larger areas than two-dimensional antennae, providing full or double wavelength antenna capabilities. Accordingly, US20070182559 describes an RFID antenna that is fabricated to operate in 3 dimensions. In this particular case, the antenna is made on an unfolded packaging substrate; however, it is noted that in US20070182559, no conventional inlay is used.

An inlay is a functional laminate, which is used for the manufacturing of devices, e.g., smart cards, equipped with a functional component, such as a transponder device comprising chips or chip modules connected to antennas and the like. The inlay usually consists of multiple layers laminated together, for example, at least a core layer and a cover layer which is laminated therewith. Another common embodiment is to have two core layers in a material selected to properly protect the functional component which is embedded between them, and two cover layers covering the core layers, which are selected to present appropriate external surfaces of the inlay, for example in the purpose to be printed. The layers usually consist of a plastic material such as polycarbonate or polyethylene terephthalate.

The functional component is not limited to a chip module but can also be a switch or another mechanical or electric/electronic component or a security element for example, that is suitable to be at least partially embedded in the inlay. It is basically an element different of the layers forming the inlay and which is adding a defined functionality to the inlay. Generally, such elements are made of and/or are packaged in a material which is much more robust than the inlay material. A typical example is a chip module or a chip.

Prior art reference European publication EP2605189 describes a three-dimensionally structured RFID tag that involves the use of an inlay. A flexible and substantially flat inlay comprising a transponder device with at least an antenna is inserted into a container, e.g., a cylindrical container. FIG. 1 illustrates a typical flat inlay 1, comprising a carrier substrate 2, a transponder circuit 3 and an antenna 4, the latter two being attached to the carrier substrate 2. Referring now to FIG. 2, the flat inlay is bent to such a shape 1.1 that it may fit into an opening 6 of the container 5. In case the container is a cylindrical container, the flat inlay may for example simply be rolled as is indicated by a double arrow in shape of a circle. The whole assembly of container and inlay constitutes a three-dimensional RFID tag structure, which is for example tubular-shaped.

As of today there are several tag solutions available on the market to track items, such as for example palettes, that can be mounted externally in a visible fashion or embedded in a non-visible fashion, such as for example into one of the pillars of the palette. The price target for such tag solutions is constantly and aggressively being lowered.

The present invention aims at reducing the price for a tag solution to the lowest, i.e., at providing a tubular shaped tag structure that is cheaper to produce.

SUMMARY OF INVENTION

In a first aspect, the invention provides a self-sustainable substantially tubular shaped tag structure, comprising a flexible and substantially flat inlay comprising a substrate and at least an antenna; a wall of the tubular shaped tag structure constituted directly and solely by the inlay that is formed into the shape of the wall, thereby excluding any other material to carry the inlay and realize the wall; and a seam configured to close the tubular shaped tag structure and involving borders of the inlay.

In a preferred embodiment, the inlay is configured to form the whole wall of the tag structure, and sides at opposite extremities of the inlay are fixed to each other to close the tag structure.

In a further preferred embodiment the inlay is substantially rectangular shaped with two opposite length sides and two opposite end sides. The inlay is bent into the tubular shaped tag structure, the two opposite length sides being fixed to each other to form a lengthwise closing seam of the tag structure, and the two opposite end sides being configured to close a volume made by the tag structure.

In a further preferred embodiment, the tag structure comprises a filler material that is one of the list comprising a reinforcement substance, a magnetic powder, a substance of consumption, and a pharmaceutical drug.

In a second aspect, the invention provides a method of manufacturing a self-sustainable substantially tubular shaped tag structure, comprising pushing a sheet of substrate comprising at least a flexible and flat inlay along a tubular shaped spindle; shaping the sheet by bending it around the tubular shaped spindle; positioning opposites sides of the sheet next to each other during the shaping and attaching the opposite sides to each other thereby forming a lengthy body of the tag structure; and obstructing diametrical sections of the lengthy body such that two successively obtained obstructed sections enclose the bent flexible and flat inlay, and the tag structure corresponds to the lengthy body delimited by the two successive obstructed sections.

In a further preferred embodiment the method further comprises cutting the sheet of substrate substantially in at least one of the obstructed sections, hence obtaining an isolated tag structure.

BRIEF DESCRIPTION OF THE FIGURES

The invention will be better understood through the detailed description of preferred embodiments of the invention and in light of the drawings, wherein.

Same references will be used throughout the description and figures to designate same of similar features.

DETAILED DESCRIPTION

The invention relates to tags, which may also be referred to as smart tags or contactless tags. As already stated herein above, tags may for example be put to use to track items.

When implemented with RFID technology, the tag typically comprises an RFID inlay. An inlay comprises the substrate and other optional layers to support the functional component.

The typical RFID inlay is flexible. RFID inlays are typically sold in reels or rolls comprising hundreds to thousands of inlays. Generally, the RFID tags can be either active or passive, depending on whether they include an internal energy source, or they are operated with the electromagnetic field generated by the RFID reader device.

The antenna can for example be configured to operate at LF (Low Frequency: 20-200 kHz), HF (High Frequency: 3-30 MHz) or UHF (Ultra-High Frequency: over 300 MHz). A LF or HF would have the form of a coil antenna with multiple windings. The UHF antenna can be for example a patch antenna, a slot antenna or a dipole antenna.

Figure 3:
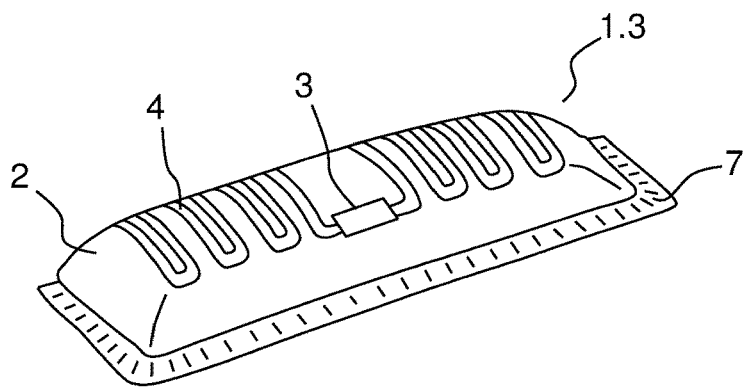
FIG. 3 illustrates an example of a tag structure according to the invention.

FIG. 3 illustrates an example of a tag structure according to the invention. In this case the tag structure is a tubular structure 1.3. The same inlay from prior art as known from FIG. 1 may be used to make the tubular structure 1.3. This inlay is flexible and substantially flat, and comprises at least the antenna 4.

In this particular embodiment the inlay is formed into the tag structure that is self-sustainable. The property of being self-sustainable is due to a degree of rigidity that characterizes the substrate 2. The self-sustainable part corresponds to a wall of the tubular structure 1.3, which is constituted directly and solely by the inlay that is formed into the shape of the wall, thereby excluding any other material to carry the inlay and realize the wall. The inlay is wrapped or bent on itself and seamed on its borders—as illustrated by a rim 7 that corresponds to a peripheral zone of the inlay—to close the tag structure, thereby forming the whole tubular shaped tag structure 1.3.

The inlay (HF or UHF) may preferably be made of one or more layers of selected material(s). Many different materials can be used as long as the resulting inlay show the desired characteristic to be flexible enough to be bent in the tubular form and straight enough to form a self-sustainable structure once the borders of the inlay are seamed together. Typically, the layers of material used show a thickness of few microns to some hundreds of microns.

RFID inlays commonly available on the market are made of plastic material: mainly polyesters, as PET (polyethylene terephthalate), PP (polypropylene) or PE (polyethylene), but also PC (polycarbonate), ABS (acrylonitrile butadiene styrene), PVC (polyvinyl chloride), PI (polyimide), etc. Other examples of applicable materials would be paper, synthetic paper (i.e. Teslin) or biodegradable material such as PLA. Naturally a combination of different materials on the form of a co-laminated multilayers construct will form an ideal inlay combining advantageously the characteristics the selected materials.

In a preferred embodiment the inlay may be formed by two laminated core layers of PET material between which the antenna (and the connected chip) is embedded. Preferably, a printable cover layer (for ex. of paper) is also co-laminated with, such to form what will be the external surface of the bent structure. An internal cover layer could be also added, for example to avoid chemical reactions with the material with which the tag structure is going to be filled (for ex. if the tag structure is used as container for a pharmaceutical drug).

One can also for example use an antenna supporting substrate layer out of polyimide (PI) material, which gives the inlay an advantageous stability to high temperature and mechanical strains. The substrate layer with the antenna can then be embedded between two layers of thermoplastic elastomer, which have the advantage to present a workable surface (for ex. to be printed) and to be easily attached together (subject to welding, bonding, or gluing).

The seam of the peripheral zones of the inlay may be performed by any conventional method known to the person skilled in the art, such as (ultrasonic) bonding, (thermal) welding, gluing, and will not be explained in any more detail in this specification.

Figure 1:
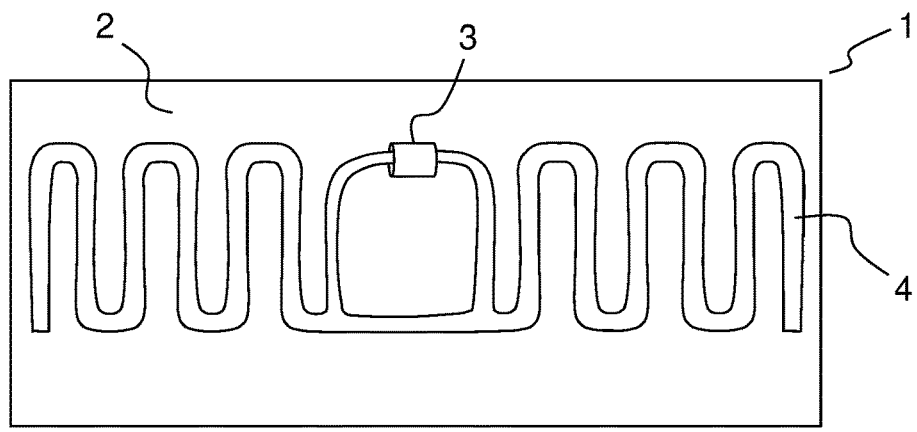
FIG. 1 is a schematic illustration of a flat inlay according to prior art.
Figure 2:
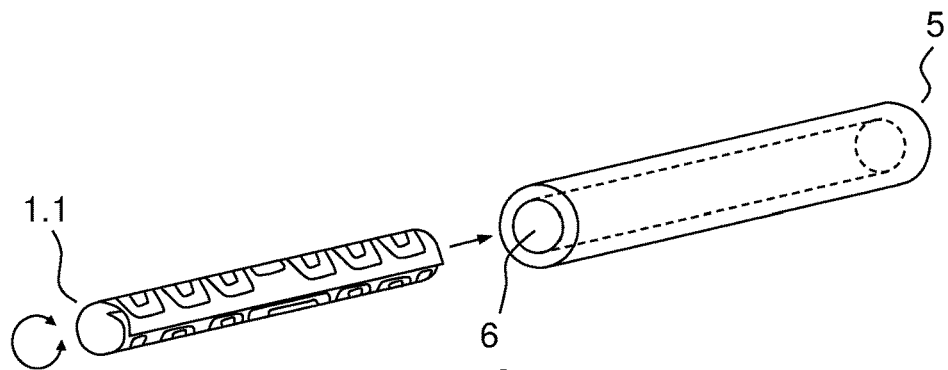
FIG. 2 is a schematic illustration of a tag structure assembly according to prior art.
Figure 4:
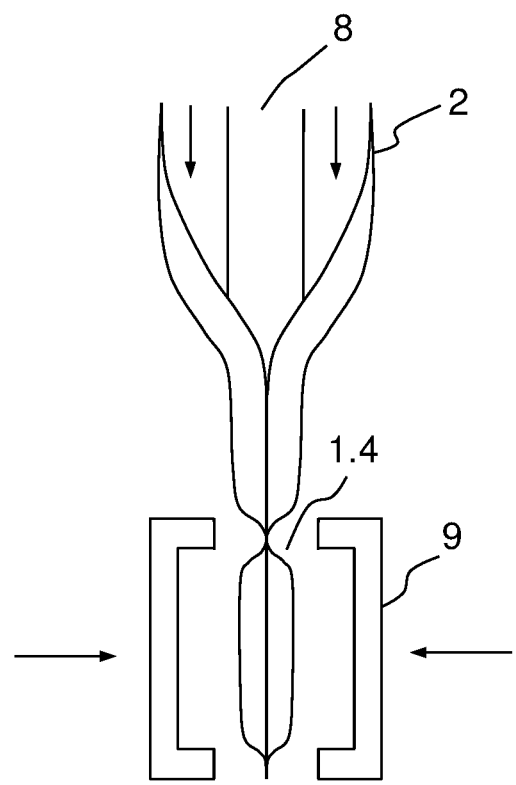
FIG. 4 illustrate an example of a manufacturing device for obtaining a tag structure according to the invention.

FIG. 4 illustrates an example of a manufacturing device for obtaining a tag structure according to the invention. The manufacturing device comprises a tubular shaped spindle 8, the shape which corresponds to the desired tubular shape for the tag structure. A sheet of substrate 2 that comprises at least an inlay similar to the one known from prior art as shown in FIG. 1, is pushed to slide along the tubular shaped spindle 8 in the direction the two arrows parallel to the spindle illustrate in FIG. 4. The sheet of substrate is shaped by bending it around the tubular shaped spindle. This may be done using any conventional means for manufacturing tubing, and is not illustrated in FIG. 4. After the step of shaping opposite sides of the sheet are positioned next to each other in order to be attached to each other in a seam thereby forming a lengthy body of the tag structure. The step of attaching may be performed according to any known process, including for example welding and gluing. It may optionally also be performed further down the chain of manufacturing in a step following the shaping, by means of a welding press 9 which in this case is employed to press opposite sides of the sheet against each other, optionally also heating the substrate.

In the example of FIG. 4, the press 9 is used to obstruct diametrical sections of the lengthy body of the tag structure, e.g., by pressure force on the substrate, and this is done such that two successively obtained obstructed sections are positioned to enclose the bent flexible inlay. Finally, the lengthy body delimited by the two successive obstructed sections corresponds to the desired tubular shaped tag structure with an inlay. In FIG. 4 one of the two obstructed diametrical sections is referenced 1.4, the other one being at the opposite extremity of the tag structure, in this particular example positioned to correspond to a part of press 9 used to obstruct the tag structure.

In a preferred embodiment not illustrated in FIG. 4, the manufacturing device and/or method comprises a cutting device and/or step whereby the sheet of substrate 2 is cut substantially in at least one of the obstructed sections of the tag structure, hence allowing to obtain an isolated structure.

Figure 5:
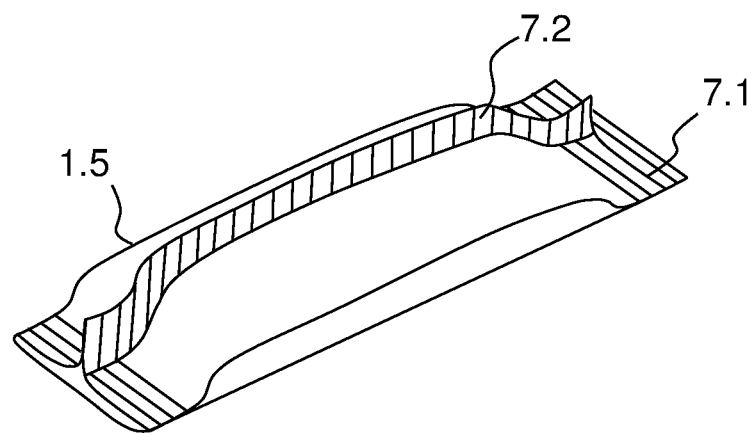
FIG. 5 illustrates a further example of a tag structure according to the invention.

FIG. 5 illustrates tag structure 1.5 as resulting from the process described above in relation with the FIG. 4. The tag structure 1.5 here is made from a single flat inlay (not illustrated in FIG. 5 for a better readability). Hence the inlay is configured to form the whole of the tag structure 1.5, whereby sides at opposite extremities of the inlay are fixed to each other to form a seam and close the tag structure. More particularly, the opposite extremities on the length of the tag structure are joined and fixed on a length rim 7.2 while the opposite extremities that close the tubular tag structure are joined and fixed at rims 7.1.

In a preferred embodiment the tag structure is provided with some filler material (not illustrated in the figures), which for example may reinforce technically the self-sustainability of the tag structure. In reference to the process of FIG. 4, the spindle 8 which is a hollow tube could be coupled to a reservoir of the filler material, and can be used to inject the filler material inside of the tag structure while it is formed. Such a process is commonly used in the state of the art, for example to fill up sugar doses made of plasticized paper.

In case the filler material is a magnetic powder, this may be used to improve the read distance of the tag in the tag structure.

In a further example also not illustrated in the figures, the filler material may be a substance of consumption, e.g., sugar or chocolate powder.

In a further example also not illustrated in the figures the filler material may be a dose of a pharmaceutical drug.

The inventive tag structure may be used for example for palette tagging with the aim of identifying the palette. The tag may be mounted on the palette to remain visible, but preferably the tag is embedded into the palette as in this manner, there is a lower risk to damage or break the tag during handling.

The tag structure solution provided by the invention is cheaper to produce than tag structures from prior art since it lacks any additional support structure for the inlay such as for example the cylindrical container discussed in the above Background section. A typical price range for the tag structure according to the invention is below 1 euro per piece.

Although the present invention has been described with reference to preferred embodiments, workers skilled in the art will recognize that changes may be made in form and detail without departing from the spirit and scope of the invention.

The invention claimed is:

1. A tag structure, comprising:
   a substantially tubular-shaped wall constituted directly and solely by a flexible and substantially flat inlay formed into the substantially tubular shape of the wall, thereby excluding any other material to carry the inlay and realize the wall, the inlay comprising a substrate and an antenna; and
   at least one seam fixing sides of the inlay along at least one peripheral zone of the inlay to close the substantially tubular-shaped wall forming an entirely enclosed interior space of the tag structure.

2. The tag structure of claim 1, wherein the inlay is formed as an integral body of multiple layers, including the substrate, which are laminated together, and the antenna is fully embedded between two of the multiple layers.

3. The tag structure of claim 2, wherein the multiple layers comprise at least two layers of polyethylene terephthalate between which the antenna is embedded.

4. The tag structure of claim 2, wherein an external one of the multiple layers comprises a printable layer.

5. The tag structure of claim 1, wherein:
   the flexible and substantially flat inlay is substantially rectangular-shaped with two opposite length sides and two opposite end sides; and
   the flexible and substantially flat inlay is bent into the substantially tubular shape of the wall, with the two opposite length sides being fixed to each other to form a first seam, a first of the two opposite end sides is closed by a second seam, and a second of the two opposite end sides is closed by a third seam.

6. The tag structure of claim 5, wherein the interior space is at least partially filled by a filler material.

7. The tag structure of claim 6, wherein the filler material comprises one or more of a reinforcement substance, a magnetic powder, a substance of consumption, or a pharmaceutical drug.

8. The tag structure of claim 5, wherein:
the two opposite length sides are fixed to each other by one or more of ultrasonic bonding, thermal welding, or gluing; and
each of the two opposite end sides are closed by one or more of ultrasonic bonding, thermal welding, or gluing.

9. The tag structure of claim 1, wherein the interior space is at least partially filled by a filler material.

10. The tag structure of claim 9, wherein the filler material comprises one or more of a reinforcement substance, a magnetic powder, a substance of consumption, or a pharmaceutical drug.

11. The tag structure of claim 1, wherein the at least one seam includes at least one of an ultrasonic bonded seam, a thermal welded seam, or a glued seam.

12. A method of manufacturing a tag structure, the method comprising:
pushing a sheet of substrate comprising at least a flexible and flat inlay and an antenna along a tubular-shaped spindle;
shaping the sheet by bending it around the tubular-shaped spindle;
positioning opposite sides of the sheet next to each other during the shaping and attaching the opposite sides to each other thereby forming a substantially tubular-shaped body of the tag structure; and
obstructing diametrical sections of the substantially tubular-shaped body to close diametrical ends thereof.

13. The method of claim 12, further comprising cutting the sheet of substrate substantially in at least one of the obstructed sections, hence obtaining an isolated tag structure.

14. The method of claim 13, wherein obstructing diametrical sections of the substantially tubular-shaped body comprises closing each diametrical section using one or more of bonding, welding, or gluing.

15. A three-dimensional tag structure, comprising a flexible, multiple layer inlay comprising an antenna embedded between two layers thereof, wherein at least one seam seals together at least a first set of opposite edges of the inlay and forms an entirely enclosed volume of the tag structure.

16. The tag structure of claim 15, wherein the at least one seam is formed by one or more of bonding, welding, or gluing.

17. The tag structure of claim 15, wherein the volume of the tag structure is at least partially filled by a filler material.

18. The tag structure of claim 17, wherein the filler material comprises one or more of a reinforcement substance, a magnetic powder, a substance of consumption, or a pharmaceutical drug.

* * * * *